United States Patent
Dolinskiy et al.

(10) Patent No.: US 9,611,154 B2
(45) Date of Patent: Apr. 4, 2017

(54) METHOD FOR PURIFYING WATER FORMED DURING HYDROCARBON SYNTHESIS

(71) Applicant: OBSHCHESTVO S OGRANICHENNOY OTVETSTCENNOST'YU "GAZOKHIM TEKHNO", d. Skolkovo (RU)

(72) Inventors: Sergey Erikovich Dolinskiy, Moscow (RU); Alexander Alexandrovich Dergachev, Moscow (RU)

(73) Assignee: OBSHCHESTVO S ORGANICHENNOY OTVETSTVENNOST' YU "GAZOHIM TEKHNO", Skolkova (RU)

( * ) Notice: Subject to any disclaimer, the term of this patent is extended or adjusted under 35 U.S.C. 154(b) by 0 days.

(21) Appl. No.: 14/889,133

(22) PCT Filed: Sep. 30, 2013

(86) PCT No.: PCT/RU2013/000859
§ 371 (c)(1),
(2) Date: Nov. 4, 2015

(87) PCT Pub. No.: WO2015/038028
PCT Pub. Date: Mar. 19, 2015

(65) Prior Publication Data
US 2016/0068409 A1  Mar. 10, 2016

(30) Foreign Application Priority Data

Sep. 11, 2013 (RU) .............. 2013141615

(51) Int. Cl.
| | | |
|---|---|---|
| *C10G 2/00* | (2006.01) |
| *C01B 3/36* | (2006.01) |
| *C01B 3/34* | (2006.01) |
| *C02F 1/16* | (2006.01) |
| *C02F 1/72* | (2006.01) |
| *C02F 101/32* | (2006.01) |
| *C02F 1/74* | (2006.01) |
| *C02F 103/36* | (2006.01) |
| *C02F 101/34* | (2006.01) |

(52) U.S. Cl.
CPC ............... *C02F 1/16* (2013.01); *C01B 3/34* (2013.01); *C01B 3/36* (2013.01); *C02F 1/725* (2013.01); *C10G 2/30* (2013.01); *C10G 2/35* (2013.01); *C01B 2203/0233* (2013.01); *C01B 2203/0255* (2013.01); *C01B 2203/062* (2013.01); *C01B 2203/1241* (2013.01); *C01B 2203/1247* (2013.01); *C02F 1/74* (2013.01); *C02F 2101/32* (2013.01); *C02F 2101/34* (2013.01); *C02F 2103/365* (2013.01); *C02F 2209/02* (2013.01)

(58) Field of Classification Search
CPC .... C10G 2/30; C10G 2/35; C01B 3/34; C01B 2203/1247; C01B 2203/062; C01B 3/36; C01B 2203/0255; C02F 1/16; C02F 1/74; C02F 2103/365; C02F 2209/02
USPC .......................................... 210/750; 518/700
See application file for complete search history.

(56) References Cited

FOREIGN PATENT DOCUMENTS

| | | |
|---|---|---|
| EA | 008048 B1 | 5/2003 |
| RU | 2433085 C2 | 1/2005 |
| SU | 1825748 A1 | 3/2008 |
| WO | 99/15483 A1 | 8/1997 |
| WO | 2007/094766 A1 | 3/2011 |

OTHER PUBLICATIONS

International Search Report, PCT/RU2013/000859, Jun. 19, 2014.

*Primary Examiner* — Jafar Parsa
(74) *Attorney, Agent, or Firm* — Matthew A. Pequignot; Pequignot + Myers LLC

(57) ABSTRACT

A method for the utilization of reaction water formed during the synthesis of hydrocarbons from synthesis gas in a GTL process includes the cleaning of oxygenates while quenching of the synthesis gas at a temperature of more than 500° C. while in contact with a catalyst for steam conversion of oxygenates, and the degasification of the cleaned up reaction water. Cleaned up and degasified water is utilized for cooling synthesis gas to a temperature of lower than 400° C. and for water steam production. The invention ensures efficient treatment of reaction water with removal of oxygenates, the use of obtained treated water as boiler feed water, and for the production of water steam.

4 Claims, No Drawings

METHOD FOR PURIFYING WATER FORMED DURING HYDROCARBON SYNTHESIS

RELATED APPLICATIONS DATA

This application is the national stage entry of International Appl. No. PCT/RU2013/000859, filed Sep. 30, 2013, which claims priority to Russian Patent Application No. 2013141615, filed Sep. 11, 2013. All claims of priority to that application are hereby made, and that application is hereby incorporated in its entirety by reference.

FIELD OF THE INVENTION

The invention relates to obtaining hydrocarbons from natural or associated petroleum gas by means of the Fischer-Tropsch process or MTG (Methanol-to-Gasoline conversion) or TIGAS (Topsoe Integrated Gasoline Synthesis, dimethyl ether/methanol conversion to gasoline) processes, particularly, to methods for utilization of water being formed during the stage of synthesis of hydrocarbons from synthesis gas, methanol or dimethyl ether.

BACKGROUND OF THE INVENTION

In last decades, processes of obtaining liquid hydrocarbons from natural and associated gas, so-called GTL processes, attract attention of researchers and investors as an additional source of liquid fuels, lubricants and raw materials for organic synthesis. Such processes include a stage of obtaining synthesis gas and a stage of synthesis of hydrocarbons from synthesis gas in the Fischer-Tropsch process or from methanol or dimethyl ether in the MobilOil and Haldor Topsoe processes. Close integration of stages of a GTL process, utilization of new catalysts and technologies allow to improve economic performance of production of liquid hydrocarbons from gaseous raw hydrocarbons and to exploit GTL processes on remote oil and gas fields for the sake of rational use of natural resources.

Partial oxidation of raw hydrocarbons in the presence of free oxygen and water steam is the most promising method for obtaining synthesis gas. It allows to get an at least partially heat-balanced process as far as free oxygen oxidation is an exothermic process and steam reforming of hydrocarbons is an endothermic process. Besides that, combining these methods of oxidation it is possible to control the composition of synthesis gas, the ratio of its main components CO and $H_2$. There are air, including enriched with oxygen, and pure oxygen used as a source of molecular oxygen.

As far as the second stage of GTL process is concerned, the rationale for choosing of a particular variant depends on many factors. In any case, for 1 mole of CO being converted to hydrocarbons there is formed 1 mole of water and a small amount of by-products—oxygenates (oxygen-containing hydrocarbons). After cooling and condensation of liquid products of synthesis of hydrocarbons stage, the water formed is divided from hydrocarbon products by separation. This supplementary water contains dissolved hydrocarbons and oxygenates. For example, supplement water of a Fischer-Tropsch process contains 0.02% wt. of hydrocarbons, 0.09-1.41% wt. of acidic oxygenates, and 1.00-4.47% wt. of non-acidic oxygenates depending on Fischer-Tropsch process conditions and a catalyst used (U.S. Pat. No. 7,147,775). The content of oxygenates can be especially high, up till a few percent, in reaction water of MTG and TIGAS processes of methanol and dimethyl ether conversion to hydrocarbons because it partly contains the unconverted feed components. Utilization of reaction water is connected with cleaning it up from solid particles, dissolved gases, hydrocarbons and oxygenates, and, in some cases, with cleaning it up from metal ions as well.

There is a known method for hydrocarbon obtaining by means of steam reforming of hydrocarbon feed and the Fischer-Tropsch reaction according to U.S. Pat. No. 7,323,497, in which steam for steam reforming and impoverished in oxygenates water are obtained: reaction water is heated up, and feed gas is saturated in a saturator with water steam and oxygenates that are contained in the water and form with it a low-boiling azeotropic mixture. Cleaning up the water with a low content of impurities is less expensive. It is a preferable method for all the water being formed in synthesis of hydrocarbons.

There is a known method of utilization of the supplementary water being formed during the stage of synthesis gas production and/or synthesis of hydrocarbons in the Fischer-Tropsch process from patent RU 2433085, in which the supplementary water is being treated, deairated and then used as a boiler feed, with oxygenates being removed at the stage of water treatment by at least one of the following methods: biological treatment, adsorption, membrane separation.

The most close to the given invention method of treatment and utilization of reaction water is disclosed in application WO 99/15483 for a method for obtaining liquid hydrocarbons from raw hydrocarbons. One of the variants of the prototype method comprises obtaining synthesis gas in the process of partial oxidation of feed in the presence of an oxygen-containing gas and water steam and/or water, quenching of obtained synthesis gas by injecting water in hot synthesis gas to decrease its temperature to 100-500° C., preferably to 300-400° C., its further cooling in indirect heat exchangers to a temperature of 40-130° C., preferably to 50-100° C., and condensation of water steam, dividing water condensate from synthesis gas, conversion of synthesis gas in the Fischer-Tropsch process to gaseous, liquid hydrocarbons and water, which is used in the process of partial oxidation of the feed and quenching of synthesis gas, and using gaseous hydrocarbons and water after synthesis gas quenching for electric-power generation. The electric power is used to produce oxygen.

SUMMARY OF THE INVENTION

In the method described the water obtained at the stage of synthesis of hydrocarbons (reaction water) is used at the stage of synthesis gas generation for partial oxidation of feed hydrocarbons and quenching of synthesis gas being obtained. Cleaning of the reaction water obtained at the stage of synthesis of hydrocarbons takes place during its utilization in the process of partial oxidation of the feed: organic impurities in the water convert into carbon oxides and hydrogen under conditions of a high-temperature process of partial oxidation. The portion of water used for quenching of synthesis gas contains oxygenates, and for its further utilization a special treatment is needed, but the authors of the described method for obtaining hydrocarbons do not take this fact into account because this water is used for electric-power generation.

The use of water condensate to produce process steam is only possible in the case of compliance with the requirements put on feed or boiler water. The use of the GTL process water for steam production, for example, for utilization of the heat generated in the process of synthesis of hydrocarbons from synthesis gas (when cooling the reaction zone of synthesis of hydrocarbons), requires its cleaning and some special treatment that is not provided for in the prototype method for obtaining liquid hydrocarbons.

A technical task of this invention is cleaning of reaction water from oxygenates and its utilization for steam production—is being solved in the present invention by mainly converting oxygenates that are contained in the reaction water into carbon oxides and hydrogen under conditions of quenching of synthesis gas by reaction water at a temperature of more than 500° C. while in contact with a catalyst followed by water degasification. The water cleaned up this way is flowed, if necessary, to water treatment to remove metal ions, dissolved gases and then used for steam production.

The technical result obtained by claimed invention is reduction of costs associated with equipment for treated water preparation and operating expenditures of GTL unit in general due to absence of external treated water sources and use of all treated reaction water in synthesis. Use of treated reaction water for generation of GTL process steam makes the unit independent of external water supply sources, which especially critical for installation in prairie, desert or arctic areas. Use of treated reaction water for generation of GTL process steam additionally facilitates significant reduction of chemicals consumption at water treatment stage for steam generation, since reaction water contains no hard salts (calcium and magnesium ions) and reduction of the volume of salt containing effluents being disposed of.

This technical result is obtained through method for cleaning from oxygenates of the reaction water being formed at the stage of synthesis of hydrocarbons from synthesis gas in a GTL process that includes a stage of obtaining synthesis gas from gaseous hydrocarbons under conditions of partial oxidation or steam conversion of at least a part of these hydrocarbons and a stage of synthesis of hydrocarbons from synthesis gas obtained that is characterized by conversion of at least a part of oxygenates to form mainly carbon oxides and hydrogen at the stage of obtaining synthesis gas, while conversion of at list a part of oxygenates at the stage of obtaining synthesis gas is carried out under conditions of quenching of synthesis gas by the reaction water at a temperature of more than 500° C. while in contact with a catalyst of steam conversion of oxygenates.

This technical result is obtained through method for utilization of the reaction water being formed at the stage of synthesis of hydrocarbons from synthesis gas in a GTL process that includes a stage of obtaining synthesis gas by partial oxidation of feed hydrocarbons under conditions of steam conversion of at least a part of these hydrocarbons and a stage of synthesis of hydrocarbons from the synthesis gas that employs feeding of at least a part of the reaction water to the stage of obtaining synthesis gas for carrying out steam conversion of feed hydrocarbons and for quenching of synthesis gas, while cleaning of the reaction water from oxygenates is carried out with conversion of at least a part of oxygenates to form mainly carbon oxides and hydrogen under conditions of quenching of synthesis gas by the reaction water at a temperature of more than 500° C. while in contact with a catalyst of steam conversion of oxygenates; the reaction water cleaned from oxygenates is then degasified and used for water steam production.

The proposed method for cleaning of reaction water the Fischer-Tropsch process from oxygenates is based on pyrolysis and catalytic steam conversion of alcohols, ethers, aldehydes, ketones and acids at a temperature of more than 500° C. while in contact with a catalyst that includes as a component at least one of the transition metals.

The reaction water of the process of hydrocarbon synthesis usually contains 2-5% wt. of oxygenates: acids, mainly formic and acetic; alcohols $C_1$-$C_5$, mainly methanol and ethanol; aldehydes, mainly formaldehyde, acetaldehyde and propionic aldehyde; ethers, mainly dimethyl ether. The reaction water of the Fischer-Tropsch process has the most rich composition. A combination of oxygenates in the reaction water of the Fischer-Tropsch process depends on a catalyst and conditions of the hydrocarbon synthesis process. For example, when a cobalt catalyst is used there are mainly alcohols formed as impurities. Hydrocarbon synthesis processes with the use of an acid catalyst including an intermediary stage of obtaining dimethyl ether and/or methanol mainly form methanol.

Partial oxidation of hydrocarbon feed cleaned from sulfur and nitrogen compound impurities, preferably $C_1$-$C_4$ hydrocarbons of natural or associated petroleum gas, is carried out by means of known methods by aerial oxygen and water steam in the presence of a catalyst (EP 101765, WO 2012084135), usually at a temperature of 800-1200° C. Synthesis gas leaving the catalyst layer has a temperature of not lower than 800° C., usually of 800-1100° C. Synthesis gas cooling (quenching) is carried out in a quenching zone by spraying of the reaction water being formed at the stage of synthesis of hydrocarbons from synthesis gas. At the stage of hydrocarbon synthesis the reaction water is condensed in the process of cooling the product flow containing the synthesized hydrocarbons and then divided in a separator at a temperature of 30-40° C. Effluent or recycled gas from the stage of hydrocarbon synthesis can be used as a carrier gas for spraying water into a quenching zone.

A quenching zone of synthesis gas may be located at the lower part of a synthesis gas generator (RU 2465194, WO 2001024922) or represented as a separate unit. A catalyst in the form of an oxide layer (transition metal on $Al_2O_3$, $SiO_2$ support, industrial catalysts of steam reforming of gasoline) may be deposited on a heat-resistant metallic lattice or contact elements located in the quenching zone.

The amount of reaction water necessary for cooling synthesis gas to a preselected temperature above 500° C. is injected through spray nozzles into the flow leaving a reaction zone of hydrocarbon feed and containing carbon oxides, hydrogen, steam water and methane. In the quenching zone the reaction water is being evaporated and heated till a preselected temperature of above 500° C. Under these conditions pyrolysis of oxygenates occurs, where ethers are decomposing to form corresponding acids and hydrocarbons, alcohols and acids (at temperatures of more than 700° C.)—to form carbon oxides, hydrogen, methane, ethane, ethylene, formaldehyde. Light components are the most stable: formaldehyde, methanol, ethanol, acetic acid. At lower temperatures acetone, acetaldehyde, formaldehyde are being formed; at the temperature of 700° C. pyrolysis products are mainly represented by hydrocarbons, carbon oxides and hydrogen; at temperatures of more than 800° C. pyrolysis goes at a high rate. More deep conversion of oxygenates occurs under steam conversion over a catalyst. Processes of steam refining of methanol, ethanol, acetone and acetic acid in the presence of different catalysts were extensively studied in connection with the problem of obtaining biofuel from organic materials.

It is known that in the presence of the transition metals (Pt, Pd, Rh, Ni, Co, Cu) on oxide supports there occurs steam reforming of oxygenates to mainly form carbon oxides and hydrogen (A. C. Basagiannis, X. E. Verykios.

Catalytic Steam Reforming of Acetic Acid for Hydrogen Production. International Journal of Hydrogen Energy, 2007, 32 (15), p. 3343-3355; M. Marquevichetal. Hydrogen from Biomass: Steam Reforming of Model Compounds of Fast-Hydrolysis Oil. Energy Fuels, 1999, 13 (6), p. 1160-1166). At temperatures of more than 500° C. methanol, ethanol, aldehydes and acetic acid are being almost entirely decomposed to form carbon oxides and hydrogen, and at temperatures of 650° C. and higher—even in the case of small contact time.

In a favorable case synthesis gas is being cooled in a quenching zone to the temperature of less than 500° C., preferably to 300-350° C. After cooling of synthesis gas by reaction water and chemical transformation of oxygenates containing in the reaction water further cooling of the flow obtained is carried out by the treated water. For that purpose the treated water is sprayed through pneumatic or any other appropriate nozzles located in a quenching zone downstream of a catalyst of steam conversion of oxygenates.

At the synthesis gas generator's outlet a flow is obtained with a temperature of lower than 500° C., preferably of 300-350° C., containing products of partial oxidation of hydrocarbon feed in the presence of free oxygen and water steam along with the cleaned from oxygenates reaction water used at the first stage of quenching and the water used at the second stage of quenching. The flow is cooled down in recuperation heat exchangers, the water is condensed, and the condensate is divided in a gas-liquid separator. The condensate is then degasified to remove from the water all the gases dissolved in it—carbon dioxide, light hydrocarbons, ammonia etc. The degree of degasification must meet the requirements specified for further use of the water as a boiler water and treated water for quenching of synthesis gas. The water then is treated by usual methods in order to be utilized as a feed water for boilers and for water steam production.

The proposed method for treatment and utilization of the reaction water may be realized as follows.

A GTL process includes the stage of obtaining synthesis gas by partial oxidation of associated petroleum gas in a synthesis gas generator in the presence of aerial oxygen and water steam and the stage of obtaining hydrocarbons on a 'cobalt-containing catalyst in the Fischer-Tropsch process. The synthesis gas generator is represented as an apparatus, in which a reaction zone and quenching zone are connected via the product flow of partial oxidation of feed. The outlet flow from the synthesis gas generator has the temperature of 800° C. and pressure of 0.5 MPa comprising (in kg/h) methane—3.06; carbon oxide—1922.57; hydrogen—260.01; carbon dioxide—506.11; nitrogen—4827.74; steam water—885.61. For cooling the flow to the temperature of 350° C. it is needed 2225 kg/h of water at 40° C. For cooling synthesis gas to the temperature of 600° C. in a quenching zone the reaction water with the temperature of 40° C. and pressure of 1.8 MPa at the rate of 929.29 kg/h is fed from the stage of obtaining hydrocarbons in the Fischer-Tropsch process after a three-phase separator. The reaction water has pH=2.0 and contains 0.812% wt. of alcohols, including 0.33% of methanol and 0.22% of ethanol, 0.032% wt. of organic acids, including 0.007% of formic and 0.021% of acetic acid, along with 0.0027% wt. of ketones. After the contact of the mixed flow with the catalyst containing 11% of NiO on an oxide support, the treated water (after degasification and filtration) is sprayed into the flow at the rate of 302.43 kg/h to cool synthesis gas to the temperature of 350° C. at the outlet of the quenching zone. To spray the water into the quenching zone the effluent gas from the Fischer-Tropsch process at the rate of 600 Nm$^3$/h is used with the following composition (in % vol.): CO—7.18; $H_2$—12.07; $CO_2$—4.99; $N_2$—73.90; $CH_4$—1.57; $C_2$-$C_4$ hydrocarbons—0.29. The flow from the quenching zone is fed to a recuperation heat exchanger where it is being cooled to 230° C. and then in air-cooling units—to 40° C. The water condensate is divided in a cyclone-type separator, degasified to obtain a condensate with pH=7.5-8.5 and fed to a water treatment unit where, after processes of mechanical cleaning, ultrafiltration and deionization, the treated water is obtained to be used for cooling synthesis gas to 350° C. in the quenching zone and for steam production in the process of cooling the Fischer-Tropsch reactor. A part of obtained steam—1200 Nm$^3$/h—is fed to the stage of obtaining synthesis gas to be mixed up with hydrocarbon feed, air and to the reaction zone of the synthesis gas generator.

The invention claimed is:

1. A method of synthesizing hydrocarbons from synthesis gas in a GTL process, including quenching of synthesis gas obtained with the synthesis of hydrocarbons reaction water, wherein the quenching of synthesis gas comprises:
    a first stage of quenching comprising heating the synthesis of hydrocarbons reaction water at a temperature of more than 500° C. while in contact with a catalyst of steam conversion of oxygenates, and obtaining the reaction water cleaned of the oxygenate, and
    a second stage of quenching comprising cooling the reaction water to a temperature of lower than 400° C. by spraying the reaction water cleaned from oxygenates at the first stage.

2. The method of claim 1, further comprising degassing the cleaned reaction water.

3. The method of claim 1, wherein the second step of quenching comprises cooling the reaction water to a temperature of between 300° C. and 350° C.

4. The method of claim 1, wherein the first step of quenching comprises heating the reaction water to a temperature above 700° C.

* * * * *